United States Patent [19]

Tokio

[11] Patent Number: 4,936,151
[45] Date of Patent: Jun. 26, 1990

[54] PADDLE-WHEEL TYPE FLOW METER

[75] Inventor: Sugi Tokio, Tokyo, Japan

[73] Assignee: Tokyo Keiso Kabushiki-Kaisha, Tokyo, Japan

[21] Appl. No.: 361,498

[22] Filed: Jun. 5, 1989

[30] Foreign Application Priority Data

Jun. 3, 1988 [JP] Japan ............................... 63-74096[U]

[51] Int. Cl.$^5$ ............................................... G01F 1/06
[52] U.S. Cl. ............................... 73/861.77; 73/861.87
[58] Field of Search ................. 73/187, 861.77, 861.87

[56] References Cited

U.S. PATENT DOCUMENTS

| | | | |
|---|---|---|---|
| 2,723,562 | 11/1955 | Lotz et al. | 73/861.77 |
| 3,217,539 | 11/1965 | Owen et al. | 73/861.77 |
| 3,792,610 | 2/1974 | Koutanis et al. | 73/861.77 |

Primary Examiner—Herbert Goldstein
Attorney, Agent, or Firm—Fred Philpitt

[57] ABSTRACT

In a paddle-wheel type flow meter: a paddle wheel has its paddle tips exposed to a fluid being measured; a light source emits a light to one of a pair of optical-fiber cables which are oppositely disposed from each other through a paddle-wheel housing so as to provide a transmission path of the light across the housing, the transmission path being intermittently blocked off with the paddle tips of the paddle wheel as the paddle wheel is rotatably driven by thge fluid to produce an optical-pulse train directly proportional to the rotational speed of the paddle wheel; the optical-pulse train is translated into an electrical-pulse train through an optical receiver or photoelectric converter connected to the other of the pair of the optical-fiber cables; and the electrical-pulse train is supplied to a suitable digital instrument to determine a flow rate of the fluid, because the flow rate is substantially proportional to a frequency of the electrical-pulse train corresponding to the rotational speed of the paddle wheel.

4 Claims, 1 Drawing Sheet

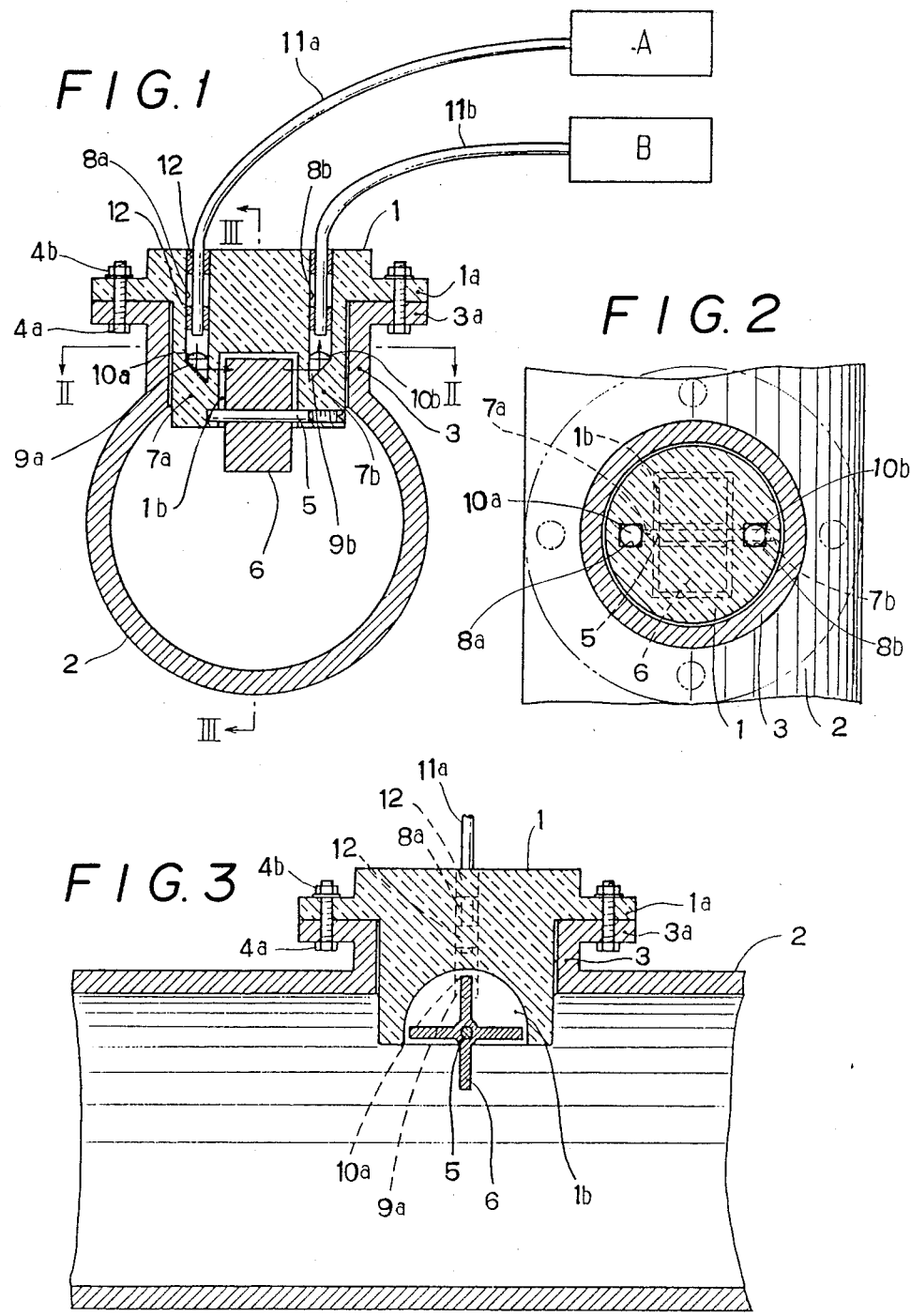

PADDLE-WHEEL TYPE FLOW METER

BACKGROUND OF THE INVENTION

1. Field of the Invention

The present invention relates to a paddle-wheel type flow meter for measuring flow rates of fluids, for example such as chemicals passing through a fluid-transport pipe, and more particularly to a paddle-wheel type flow meter in which a paddle wheel is rotatably driven by the fluids in substantially proportion to a flow rate of the fluids so that the flow rate is detected by counting the paddle tips of the paddle wheel as they pass across a transmission path of a light so as to intermittently block off the transmission path of the light.

2. Description of the Prior Art

Hitherto, a number of paddle-wheel type flow meters have been proposed.

In such conventional paddle-wheel type flow meters, a magnet is fixedly mounted on a paddle wheel which is rotatably mounted in a fluid-transport pipe. On the other hand, a magnetic head is fixedly mounted on a suitable site outside the fluid-transport pipe so as to count the number of revolutions of the paddle wheel, whereby the magnetic head issues a detection signal to a suitable electronic circuit so as to determine flow rates of the fluids passing through the transport pipe.

However, there are many adverse environments to the flow meter, for example such as those having a strong magnetic field and strong electromagnetic radiations. In such adverse environments, it is substantially impossible to expect normal operations of the magnetic head and the electronic circuit.

For example, during operation of an electrolytic apparatus for making caustic soda or sodium hydroxide, since a large amount of direct current is supplied to the apparatus, a strong magnetic field is formed around the apparatus.

Consequently, the need exists for a flow meter which will provide high reliability against such adverse environments so as to be steadily operated and to transmit a necessary flow-rate data to a suitable measuring station sufficiently remote from the adverse environments. However, such need is still not fulfilled.

SUMMARY OF THE INVENTION

It is an object of the present invention to provide a paddle-wheel type flow meter which is substantially free from any of influences exerted by adverse environments such as those of magnetic field and electromagnetic radiations in its operation and able to transmit a necessary flow-rate data obtained by the flow meter to a suitable site sufficiently remote from such adverse environments.

In the paddle-wheel type flow meter of the present invention, there are provided a pair of optical-fiber cables each of which is provided with a pair of terminals. A light source is provided in one of the terminals of one of the optical-fiber cables, while an optical receiver is provided in one of the terminals of the other one of the optical-fiber cables so that a transmission path of a light is formed between the light source and the optical receiver. A paddle wheel of the flow meter is rotatably mounted in a paddle-wheel housing across the transmission path of the light to enable the paddle tips of the paddle wheel to intermittently block off the transmission path of the light as the paddle wheel is rotatably driven by a fluid passing through a fluid-transport pipe, whereby an optical pulse train is produced by the paddle tips of the paddle wheel and transmitted to the optical receiver in which a frequency of the optical pulse train is detected to determine a rotational speed of the paddle wheel, whereby a flow rate of the fluid being measured is obtained based on the thus determined rotational speed of the paddle wheel.

In order to conduct flow measurement in the above-described manner, it is required to resolve the following problems (a) to (c). However, hitherto, a flow meter resolving theses problems (a) to (c) is still not proposed, and is therefore still not commercially available:

(a) Unless a transmission rate of a light transmitted from one of the optical-fiber cables to the other thereof through the paddle-wheel housing forming a part of the transmission path of the light is sufficiently high, it is impossible to realize a long-distance transmission of an optical signal;

(b) Since the fluids being measured are generally chemicals, it is required for the optical-fiber cables not to touch the fluids; and (c) Since the transmission rate of the light decreases when the transmission path of the light between one of the optical-fiber cables and the other thereof is smeared with dirt, it is required for a flow meter to have a construction enabling its routine cleaning to be easily conducted.

The present invention may resolve all the above problems by providing:

A paddle-wheel type flow meter comprising:
(a) a boss portion formed in a side area of a fluid-transport pipe, said boss portion being provided with a bore which communicates with the interior of said fluid-transport pipe;
(b) a plug element which is made of transparent materials while detachably inserted in said bore of said boss portion of said fluid-transport pipe;
(c) a paddle wheel which is rotatably mounted on a pair of horizontal bearing portions while rotatably driven by a fluid passing through said fluid-transport pipe, said horizontal bearing portions being provided in an inner end area of said plug element, said inner end area of said plug element being exposed to said fluid passing through said fluid-transport pipe;
(d) a pair of insertion holes so provided in an upper surface of said plug element as to substantially vertically extending downward side by side from said upper surface to reach their bottom surfaces which are in the substantially same levels as those of bearings portions of said plug element;
(e) a pair of optical-fiber cables, each of which cables is provided with a pair of terminals, one of which cables forms a light-emitting cable while the other of which cables forms a light-receiving cable, one of said terminals of said light-emitting cable being connected to a light source while the other one of said terminals serves as a light-output terminal inserted into one of said insertion holes of said plug element, one of said terminals of said light-receiving cable being connected to an optical receiver forming a photoelectric converter while the other of said terminals of said light-receiving cable serves as a light-input terminal inserted into the other of said insertion holes of said plug element; and
(f) a pair of optical reflectors, one of which serves as a light-emitting reflector and the other of which optical reflectors serves as a light-receiving reflector, said light-emitting reflector being so disposed in a bottom portion of one of said insertion holes of said plug element as to receive a light emitted from said light-emitting cable, said light having been received by said light-emitting reflector being oriented toward a paddle-wheel housing so as to pass across said paddle-wheel housing, said light-receiving reflector being so disposed in a bottom portion of the other one of said insertion holes of said plug element as to receive said light emitted from said light-emitting reflector, said light having been received by said light-receiving reflector being oriented toward said light-receiving cable.

BRIEF DESCRIPTION OF THE DRAWINGS

FIG. 1 is a cross-sectional view of the paddle-wheel type flow meter of the present invention;

FIG. 2 is a cross-sectional view of a boss portion of the fluid-transport pipe in which the flow meter of the present invention is fixedly mounted, the view being taken along the line II—II of FIG. 1; and FIG. 3 is a longitudinal sectional view of the boss portion of the fluid-transport pipe in which the flow meter of the present invention is fixedly mounted, the view being taken along the line III—III of FIG. 1.

DESCRIPTION OF THE PREFERRED EMBODIMENT

Now, an embodiment of a paddle-wheel type flow meter of the present invention will be hereinbelow described in detail with reference to the accompanying drawings.

As shown in FIGS. 1 and 3, a boss portion 3 is provided in a suitable side area ( or an upper area, in FIGS. 1 and 3) of a fluid-transport pipe 2 while provided with a bore communicating with the interior of the fluid-transport pipe 2. On the other hand, an outward flange portion 3a is formed in an upper-end area of the boss portion 3.

A plug element 1 made of suitable transparent materials such as transparent plastics is inserted into the bore of the boss portion 3.

The plug element 1 is provided with an outward flange portion 1a in its upper peripheral area. The outward flange portion 1a of the plug element 1 is fixedly mounted on the outward flange portion 3a of the boss portion 3 of the fluid-transport pipe 2 by means of a suitable fastening means such as a plurality of bolts 4a and nuts 4b.

A cavity portion 1b forming a paddle-wheel housing is formed in an inner-end surface of the plug element 1 so that the cavity portion 1b is exposed to fluids passing through the fluid-transport pipe 2 when the plug element 1 is inserted into the bore of the boss portion 3 of the fluid-transport pipe 2. In addition, the plug element 1 is also provided with a pair of horizontal bearing portions 7a, 7b in lower areas of opposite vertical walls of its cavity portion 1b in which a paddle wheel 6 is so received as to be rotatable on an axle 5 which is supported by the bearing portions 7a, 7b of the plug element 1. As is clear from FIGS. 1 and 3, the axle 5 extends in a direction substantially perpendicular to a longitudinal axis of the fluid-transport pipe 2 to enable the fluids to rotate the paddle wheel 6 of the flow meter of the present invention.

As is clear from the above description and FIGS. 1 and 3, the paddle wheel 6 received in the cavity portion 1b of the plug element 2 having been inserted into the bore portion 3 of the fluid-transport pipe 2 has its paddle tips exposed to the fluids passing through the fluid-transport pipe 2, and is thereby rotatably driven.

The plug element 1 is also provided with a pair of insertion holes 8a, 8b which are disposed side by side in an upper surface of the plug element 1.

These insertion holes 8a, 8b of the plug element 1 extend substantially vertically from the upper surface of the plug element 1 downward and constitute blind holes provided with bottom portions which are in the substantially same level as those of the bearing portions 7a, 7b of the plug element 1.

Into one 8a of the insertion holes 8a, 8b of the plug element 1 is inserted one of terminals of an optical-fiber cable 11a, which one of the terminals constitutes a light-output terminal. The other one of the terminals of the optical-fiber cable 11a is connected to a light source "A". On the other hand, into the other one 8b of the insertion holes 8a, 8b is inserted one of terminals of an optical-fiber cable 11b, which one of the terminals constitutes a light-input terminal. The other one of the terminals of the optical-fiber cable 11b is connected to an optical receiver B which constitutes a photoelectric converter.

A light-emitting prism 9a is provided in the bottom portion of the insertion hole 8a of the plug element 1 in the manner indicated in FIG. 1. The prism 9a is generally a right-angled total-reflecting triangular prism. On the other hand, a light-receiving prism 9b is provided in the bottom portion of the insertion hole 8b of the plug element 1 in the manner indicated in FIG. 1. The prism 9b is also generally a right-angled total-reflecting triangular prism. Consequently, a light emitted from a light source "A" enters the optical-fiber cable 11a, passes therethrough downward, and then enters the prism 9a in which the light is reflected at an inclined plane of the prism 9a sideward so as to cross the cavity portion 1b of the plug element 1 as shown in FIG. 1, whereby the light enters the other prism 9b in which the light is reflected at an inclined plane of the prism 9b upward so as to enter the other optical-fiber cable 11b through which the light is transmitted to the optical receiver B.

A pair of condenser or condensing lenses 10a, 10b are employed in the flow meter of the present invention. One 10a of the condensing lenses 10a, 10b is interposed between the light-output terminal of the optical-fiber cable 11a and the prism 9a. while the other one 10b of the condensing lenses 10a, 10b is interposed between the prism 9b and the light-input terminal of the optical-fiber cable 11b, so that the light is properly converged therebetween.

Incidentally, in the drawings: the reference numeral 12 denotes an anchorage member for properly fixing the optical-fiber cables 11a, 11b to the insertion holes 8a, 8b of the plug element 1.

In operation of the above embodiment of the paddle-wheel type flow meter of the present invention, a light is emitted from the light source "A", and then enters the optical-fiber cable 11a through which the light is transmitted to the insertion hole 8a of the plug element 1 in which the light is converged on the prism 9a through the condensing lens 10a. After entering the prism 9a, the light is reflected at the inclined plane of the prism 9a sideward to across the cavity portion 1b of the plug element 1. As a result, the light passes through spaces between the paddle tips of the paddle wheel 6 rotatably received in the cavity portion 1b of the plug element 1, and then enters the other prism 9b in which the light is reflected at the inclined plane of the prism 9b upward to enter the other condensing lens 10b through which the light is converged on the light-input terminal of the optical-fiber cable 11b through which the light is transmitted to the optical receiver B.

In case that the fluids to be measured pass through the fluid-transport pipe 2, the paddle wheel 6 of the flow meter of the present invention is rotatably driven by the fluids so that the rotational speed of the paddle wheel 6 is substantially proportional to a flow rate of the fluids, or to the quantity of the fluids per unit time.

The light emitted from the optical-fiber cable 11b to the optical receiver B is translated into an electrical signal by means of a photoelectric element of the optical receiver B. Namely, in transmission of the light, the light emitted from the prism 9a to the other prism 9b is intermittently blocked off with the paddle tips of the paddle wheel 6 of the flow meter of the present invention as they pass across the transmission path of the light in the cavity portion 1b of the plug element 1 to produce an optical-pulse train which is translated into an electrical-pulse train by means of the photoelectric element of the optical receiver B.

Consequently, a frequency of the optical-pulse train or a frequency of electrical-pulse train is directly proportional to the rotational speed of the paddle wheel 6 of the flow meter of the present invention.

In the flow meter of the present invention, such frequency of the electrical-pulse train enter a suitable digital instrument to detect the flow rate of the fluids being measured, because the frequency of the electrical-pulse train is substantially proportional to the flow rate of the of the fluids.

In addition, in the paddle-wheel type flow meter of the present invention, since the condensing lenses 10a and 10b are provided in the vicinity of the light-output terminal of the optical-fiber cable 11a connected to the light source "A" and in the vicinity of the light-input terminal of the optical-fiber cable 11b connected to the optical receiver B respectively, the light is efficiently transmitted to realize a long-distance transmission of the light.

Furthermore, in the paddle-wheel type flow meter of the present invention, since only the inner-end area of the plug element 1 touches the fluids being measured and any of the other components of the flow meter such as the condensing lenses 10a, 10b, prisms 9a, 9b and the optical-fiber cables 11a, 11b does not touch the fluids at all, there is no fear that these components of the flow meter are deteriorated in material properties by the fluids being measured.

In addition, in the flow meter of the present invention, since the plug element 1 is easily and solely removed from the boss portion 3 of the fluid-transport pipe 2, it is very easy for the user to carry out cleaning operation of the transparent portions of the plug element 1 in case that the transparent portions of the plug element 1 is smeared with dirt.

As described above, the present invention provides the paddle-wheel type flow meter in which the optical-fiber cables 11a, 11b are employed to transmit the light through the transmission path of the light passing across the cavity portion 1b in which the light is intermittently blocked off with the paddle tips of the rotating paddle wheel 6 to produce an optical-pulse train a frequency of which is directly proportional to the rotational speed of the paddle wheel 6 of the flow meter of the present invention, which rotational speed is substantially proportional to the flow rate of the fluids passing through the fluid-transport pipe 2 to make it possible that the flow meter of the present invention measures the flow rate of the fluids substantially without being affected in measuring accuracy by the adverse environments such as a strong magnetic field and areas of strong electromagnetic radiations.

Incidentally, the optical prisms 9a, 9b may be replaced with any other suitable optical reflectors such as optical mirrors inclined at an angle of 45° in the bottom portions of the insertion holes 8a, 8b of the plug element 1 of the flow meter of the present invention.

While the present invention has been described in connection with the particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of the present invention.

What is claimed is:

1. A paddle-wheel type flow meter comprising:
   (a) a boss portion formed in a side area of a fluid-transport pipe, said boss portion being provided with a bore which communicates with the interior of said fluid-transport pipe;
   (b) a plug element which is made of transparent materials while detachably inserted in said bore of said boss portion of said fluid-transport pipe;
   (c) a paddle wheel is rotatably mounted on a pair of horizontal bearing portions while rotatably driven by a fluid passing through said fluid-transport pipe, said horizontal bearing portions being provided in an inner end area of said plug element, said inner end area of said plug element being exposed to said fluid passing through said fluid-transport pipe;
   (d) a pair of insertion holes so provided in an upper surface of said plug element as to substantially vertically extending downward side by side from said upper surface to reach their bottom surfaces which are in the substantially same levels as those of bearings portions of said plug element;
   (e) a pair of optical-fiber cables, each of which cables is provided with a pair of terminals, one of which cables forms a light-emitting cable while the other of which cables forms a light-receiving cable, one of said terminals of said light-emitting cable being connected to a light source while the other one of said terminals serves as a light-output terminal inserted into one of said insertion holes of said plug element, one of said terminals of said light-receiving cable being connected to an optical receiver forming a photoelectric converter while the other of said terminals of said light-receiving cable serves as a light input terminal inserted into the other of said insertion holes of said insertion holes of said plug element; and
   (f) a pair of optical reflectors, one of which serves as a light-emitting reflector and the other of which optical reflectors serves as a light receiving reflector, said light-emitting reflector being so disposed in a bottom portion of one of said insertion holes of said plug element as to receive a light emitted from said light-emitting cable, said light having been received by said light-emitting reflector being oriented toward a paddle-wheel housing so as to pass across said paddle-wheel housing, said light-receiving reflector being so disposed in a bottom portion of the other one of said insertion holes of said plug element as to receive said light emitted from said light-emitting reflector, said light having been received by said light-receiving reflector being oriented toward said light-receiving cable.

2. The paddle-wheel type flow meter as set forth in claim 1 wherein:
said pair of said optical reflectors are constructed of optical prisms.

3. The paddle wheel type flow meter as set forth in claim 1 wherein:
said pair of said optical reflectors are constructed of optical mirrors obliquely disposed in said bottom portions of said insertion holes of said plug element.

4. A paddle-wheel type flow meter comprising:
(a) a boss portion formed in a side area of a fluid-transport pipe, said boss portion being provided with a bore which communicates with the interior of said fluid-transport pipe;
(b) a plug element which is made of transparent materials while detachably inserted in said bore of said boss portion of said fluid-transport pipe;
(c) a paddle wheel which is rotatably mounted on a pair of horizontal bearing portions while rotatably driven by a fluid passing through said fluid-transport pipe, said horizontal bearing portions being provided in an inner end area of said plug element, said inner end area of said plug element being exposed to said fluid passing through said fluid-transport pipe;
(d) a pair of insertion holes so provided in an upper surface of said plug element as to substantially vertically extending downward side by side from said upper surface to reach their bottom surfaces which are in the substantially same levels as those of beatings portions of said plug element;
(e) a pair of optical-fiber cables, each of which cables is provided with a pair of terminals, one of which cables forms a light emitting cable while the other of which cables forms a light-receiving cable, one of said terminals of said light-emitting cable being connected to a light source while the other one of said terminals serves as a light-output terminal inserted into one of said insertion holes of said plug element, one of said terminals of said light-receiving cable being connected to an optical receiver forming a photoelectric converter while the other of said terminals of said light-receiving cable serves as a light-input terminal inserted into the other of said insertion holes of said plug element;
(f) a pair of optical reflectors, one of which serves as a light-emitting reflector and the other of which optical reflectors serves as a light-receiving reflector, said light emitting reflector being so disposed in a bottom portion of one of said insertion holes of said plug element as to receive a light emitted from said light-emitting cable, said light having been received by said light-emitting reflector being oriented toward a paddle-wheel housing so as to pass across said paddle-wheel housing, said light-receiving reflector being so disposed in a bottom portion of the other one of said insertion holes of said plug element as to receive said light emitted from said light emitting reflector, said light having been received by said light-receiving reflector being oriented toward said light-receiving cable; and
(g) a pair of condensing lenses one of which is interposed between said light-output terminal of said light-emitting cable and said light-emitting reflector, the other one of which condensing lenses is interposed between said light-input terminal of said light-receiving cable and said light-receiving reflector.

* * * * *